United States Patent
Wong et al.

(10) Patent No.: US 12,498,383 B2
(45) Date of Patent: Dec. 16, 2025

(54) METHODS RELATING TO SEPSIS ASSOCIATED ACUTE KIDNEY INJURY

(71) Applicant: CHILDREN'S HOSPITAL MEDICAL CENTER, Cincinnati, OH (US)

(72) Inventors: Hector R. Wong, Cincinnati, OH (US); Natalja Stanski, Cincinnati, OH (US)

(73) Assignee: Children's Hospital Medical Center, Cincinnati, OH (US)

(*) Notice: Subject to any disclaimer, the term of this patent is extended or adjusted under 35 U.S.C. 154(b) by 845 days.

(21) Appl. No.: 17/772,004

(22) PCT Filed: Oct. 27, 2020

(86) PCT No.: PCT/US2020/070697
§ 371 (c)(1),
(2) Date: Apr. 26, 2022

(87) PCT Pub. No.: WO2021/087508
PCT Pub. Date: May 6, 2021

(65) Prior Publication Data
US 2022/0390467 A1    Dec. 8, 2022

Related U.S. Application Data

(60) Provisional application No. 62/926,626, filed on Oct. 28, 2019.

(51) Int. Cl.
*G01N 33/68* (2006.01)
(52) U.S. Cl.
CPC ..... *G01N 33/6893* (2013.01); *G01N 2800/26* (2013.01); *G01N 2800/50* (2013.01)

(58) Field of Classification Search
None
See application file for complete search history.

(56) References Cited

U.S. PATENT DOCUMENTS 9,669,055 B1 * 6/2017 Blough ............... B01J 23/10

FOREIGN PATENT DOCUMENTS

WO    2013119871 A1    8/2013

OTHER PUBLICATIONS

International Search Report and Written Opinion for PCT/US2020/070697, mailed Feb. 23, 2021 (10 pages).
Stanski et al., "Prognostic and predictive enrichment in sepsis", Nat Rev Nephrol, Nature Publishing Group, GB, 16(1):20-31 (2019).
Wong et al., "A Multibiomarker-Based Model for Estimating the Risk of Septic Acute Kidney Injury", Crit Care Med 43(8):1646-1653 (2015).
Zhou et al., "A simple risk score for prediction of sepsis associated-acute kidney injury in critically ill patients", J Nephrol 32(6):947-956 (2019).

* cited by examiner

*Primary Examiner* — Changhwa J Cheu
(74) *Attorney, Agent, or Firm* — KDW Firm PLLC (57) ABSTRACT

The disclosure provides methods for determining whether a sepsis patient is likely to develop severe sepsis associated acute kidney injury (SA-AKI) using a combination of clinical data and biomarker data obtained during the first 24 hours following the subject's diagnosis with sepsis. The methods described here are useful for preventing SA-AKI in at-risk patients as well as for point-of-care clinical decision support and stratifying septic shock patients for clinical trials.

16 Claims, 3 Drawing Sheets

METHODS RELATING TO SEPSIS ASSOCIATED ACUTE KIDNEY INJURY

CROSS REFERENCE TO RELATED APPLICATIONS

This application is a national stage application, filed under 35 U.S.C. § 371, of International Application No. PCT/US2020/070697, entitled "METHODS RELATING TO SEPSIS ASSOCIATED ACUTE KIDNEY INJURY," filed Oct. 27, 2020, which claims the benefit of priority under 35 U.S.C. § 119(e) to U.S. Provisional Application No. 62/926,626, filed on Oct. 28, 2019, each of which is incorporated herein by reference in its entirety.

STATEMENT REGARDING FEDERALLY-SPONSORED RESEARCH

This invention was made with government support under R35GM126943 awarded by the National Institute of General Medical Sciences. The government has certain rights in the invention.

FIELD OF THE INVENTION

The invention disclosed herein generally relates to methods for identifying sepsis patients at risk of sepsis associated acute kidney injury using a combination of patient clinical data and biomarker data, and related methods.

BACKGROUND

Septic shock is a common and consequential diagnosis in critically ill adults and children, associated with significant morbidity, mortality, and substantial cost to the health care system. Acute kidney injury (AKI) impacts up to one half of patients admitted to the intensive care unit, increasing the risk for poor outcomes in those afflicted. The co-incidence of septic shock and AKI is associated with even worse outcomes than either condition alone, with mortality rates as high as 70% cited in some studies.

Sepsis-associated AKI (SA-AKI) is a common phenomenon, impacting up to half of all critically ill patients admitted with a diagnosis of septic shock. Compounding the significant consequences of SA-AKI is the lack of available disease-modifying therapies once present. As a result, the mainstay of therapy remains supportive care aimed at renal protection, which is likely more effective if coupled with early detection of at risk patients. While there are epidemiologic data available to suggest certain patient characteristics that may predispose to SA-AKI (Bagshaw et al., *Clin J Am Soc Nephrol* 2007 2:431-439; Bagshaw et al., *Crit Care* 2008 12: R47; Fitzgerald et al., *Pediatr Nephrol* 2018 33:1781-1790), more advanced attempts to identify those at risk have not resulted in a reliable prediction strategy thus far (et al., Serum Neutrophil Gelatinase-associated Lipocalin (NGAL) as a Marker of Acute Kidney Injury in Critically Ill Children with Septic Shock. *Crit Care Med* 2008 36:1297-1303; Kim et al., Is plasma neutrophil gelatinase-associated lipocalin a predictive biomarker for acute kidney injury in sepsis patients? A systematic review and meta-analysis. *J Crit Care* 2016 33:213-223; Tu et al., Urinary netrin-1 and KIM-1 as early biomarkers for septic acute kidney injury. *Ren Fail* 2014 36:1559-1563; Honore et al., Urinary Tissue Inhibitor of Metalloproteinase-2 and Insulin-Like Growth Factor-Binding Protein 7 for Risk Stratification of Acute Kidney Injury in Patients With Sepsis. *Crit Care Med* 2016 44:1851-1860; Basu et al., Identification of candidate serum biomarkers for severe septic shock-associated kidney injury via microarray. *Crit Care* 2011 15: R273; Song et al., Value of the combination of renal resistance index and central venous pressure in the early prediction of sepsis-induced acute kidney injury. *J Crit Care* 2018 45:204-208; Lee et al., A combination of SOFA score and biomarkers gives a better prediction of septic AKI and in-hospital mortality in critically ill surgical patients: a pilot study. *World J Emerg Surg* 2018; 13:41; Zhou et al., A simple risk score for prediction of sepsis associated-acute kidney injury in critically ill patients. *J Nephrol* 2019 6:947-956). Consequently, SA-AKI remains difficult to accurately predict in a timeframe that is clinically useful, resulting in late application of renal protective measures that are of uncertain benefit.

The present invention addresses the need to identify patients who are at risk of developing SA-AKI.

SUMMARY

The disclosure provides methods for determining whether a subject diagnosed with sepsis is likely to develop severe sepsis associated acute kidney injury (SA-AKI), and related methods for point-of-care ("POC") clinical decision support for individual sepsis patients, including methods for the prevention of SA-AKI.

The disclosure provides methods for determining whether a subject diagnosed with sepsis is at risk of developing sepsis associated acute kidney injury (SA-AKI), the methods comprising determining or receiving a combination of clinical data and biomarker data of the subject, the clinical data comprising the subject's Kidney Disease Improving Global Outcomes (KDIGO) stage for acute kidney injury (AKI) and a mortality risk; the biomarker data comprising an amount of each of heat shock protein 70 kDa 1B (HSPA1B), interleukin-8 (IL8), and granzyme B (GZMB) in a biological sample of the subject, wherein the clinical data and the biomarker data is determined during the first 24 hours following the subject's diagnosis with sepsis; and determining the subject's risk of developing SA-AKI based upon the combination of the clinical data and the biomarker data.

The disclosure provides methods for preventing SA-AKI in a subject in need thereof, the methods comprising determining or receiving a combination of clinical data and biomarker data from the subject, the clinical data comprising the subject's Kidney Disease Improving Global Outcomes (KDIGO) stage for acute kidney injury (AKI) and a mortality risk; the biomarker data comprising an amount of each of heat shock protein 70 kDa 1B (HSPA1B), interleukin-8 (IL8), and granzyme B (GZMB) in a biological sample of the subject, wherein the clinical data and the biomarker data is determined during the first 24 hours following the subject's diagnosis with sepsis; determining the subject's risk of developing SA-AKI based upon the combination of the clinical data and the biomarker data, and treating the high risk subject with renal protective therapy or renal replacement therapy (RRT) and avoiding RRT in the low risk subject.

In embodiments, determining the subject's risk of developing SA-AKI comprises assigning the subject into one of two groups based on the subject's KDIGO stage. In embodiments, the subject having a KDIGO stage of 3 is assigned to a high risk group and is determined to be at high risk (TN7) for developing SA-AKI. In embodiments, the subject having a KDIGO stage of 0, 1, or 2 is further assigned into one of two groups based upon the subject's mortality risk assessment. In embodiments, the subject having a mortality risk assessment below a predetermined cutoff value and a KDIGO stage of 0 is determined to be at low risk (TN1) for developing SA-AKI. In embodiments, the subject having a mortality risk assessment below a predetermined cutoff value and a KDIGO stage of 1 or 2 is further assigned into one of two groups based upon the subject's HSPA1B level. In embodiments, the subject having an HSPA1B level less than a predetermined cutoff value is determined to be at low risk (TN2) for developing SA-AKI and the subject having an HSPA1B level higher than a predetermined cutoff value is determined to be at high risk (TN3). In embodiments, the subject having a mortality risk assessment above a predetermined cutoff value and a KDIGO stage of 0, 1 or 2 is further assigned into one of two groups based upon the subject's IL8 level. In embodiments, the subject having an IL8 level less than a predetermined cutoff value is determined to be at low risk (TN4) for developing SA-AKI. In embodiments, the subject having an IL8 level higher than a predetermined cutoff value is further assigned into one of two groups based upon the subject's GZMB level. In embodiments, the subject having a GZMB level less than a predetermined cutoff value is determined to be at low risk (TN5) for developing SA-AKI and the subject having a GZMB level higher than a predetermined cutoff value is determined to be at high risk (TN6).

In accordance with any of the preceding embodiments, the mortality risk may be determined by a method comprising determining or receiving additional biomarker data and clinical data of the subject, the additional biomarker data comprising serum protein or peptide levels of C-C chemokine ligand 3 (CCL3) and matrix metalloproteinase 8 (MMP8), and the additional clinical data comprising platelet count.

Figure 3:
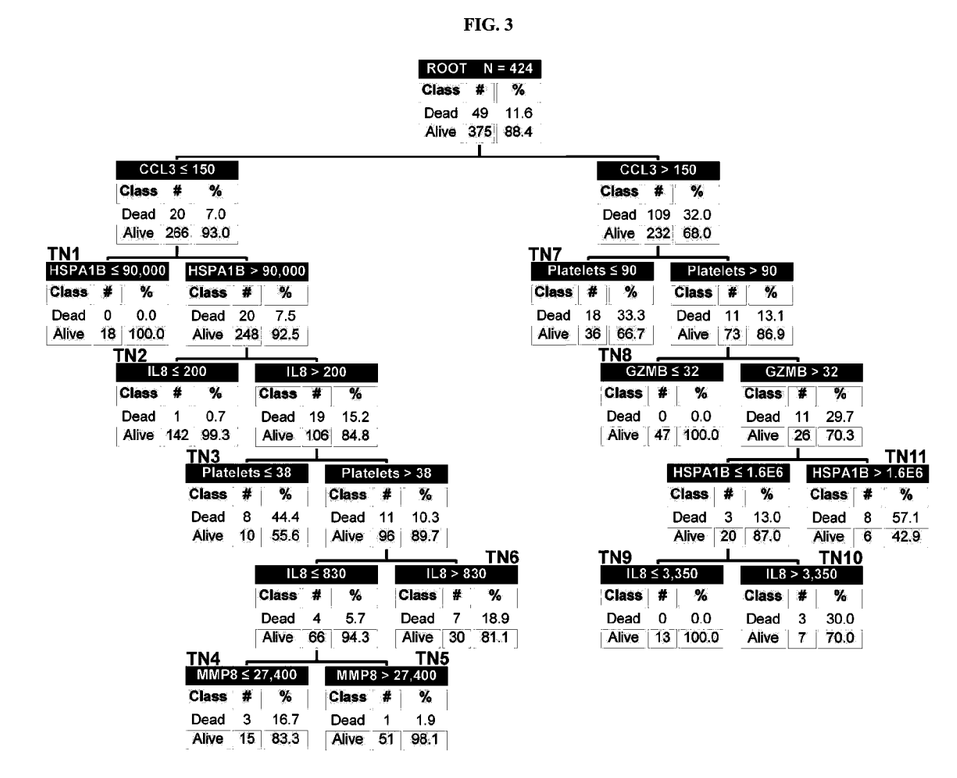

In accordance with any of the preceding embodiments, the mortality risk may be determined by a method comprising the decision tree methodology depicted in FIG. 3.

In accordance with any of the preceding embodiments, the subject is preferably human. In some embodiments, the subject is a pediatric human patient.

In accordance with any of the preceding embodiments, the SA-AKI is characterized as "severe" SA-AKI.

The disclosure also provides methods for stratifying septic shock patients based on the patients' individual risk of developing sepsis SA-AKI, the methods comprising classifying a patient with septic shock as having a high or low risk of developing severe SA-AKI using the methods described herein.

BRIEF DESCRIPTION OF THE DRAWINGS

Those of skill in the art will understand that the drawings, described below, are for illustrative purposes only. The drawings are not intended to limit the scope of the present teachings in any way.

FIG. 1: The incidence of severe $D_3$ SA-AKI, RRT use, and renal recovery from early AKI according to PERSEVERE-II risk category. The cohort was grouped into one of three PERSEVERE-II risk categories: low risk (mortality risk 0.000 to 0.019), intermediate risk (mortality risk 0.167 to 0.189), and high risk (mortality risk 0.300 to 0.571). (A) Proportion of patients with severe $D_3$ SA-AKI (p<0.001, Chi square, 2 degrees of freedom). (B) Proportion of patients requiring RRT (p<0.001, Chi square, 2 degrees of freedom) (C) Proportion of patients with renal recovery by day 3 of septic shock (p=0.039, Chi square, 2 degrees of freedom).

FIG. 2: The figure depicts the classification tree for estimating the risk of severe $D_3$ SA-AKI. The decision tree was generated using classification and regression tree (CART) methodology. CART analysis is based on a binary recursive partitioning algorithm and allows for the discovery of complex predictor variable interactions that may not be apparent with more traditional methods, such as multiple linear regression. It also has the ability to eliminate predictor variables with poor performance. All patients (n=379) are included in the root node at the top of the tree, with the corresponding number of those with and without D3 SA-AKI, and the respective rates. Patients are subsequently allocated to daughter nodes using decision rules as indicated in the top row of each node. All biomarker data are shown as pg/ml. Each daughter node provides the number of patients with and without $D_3$ SA-AKI, and the respective rates. Subsequent daughter nodes are generated, ending in terminal nodes (TN). The terminal nodes are used to assign the risk of $D_3$ SA-AKI to a patient classified to a given terminal node, which are used for construction of the AUROC. For calculation of the diagnostic test characteristics, the $D_3$ SA-AKI risk is dichotomized into those who are predicted to not have $D_3$ SA-AKI and those who are predicted to have $D_3$ SA-AKI. Patients allocated to TN1, TN2, TN4, and TN5 (D3 SA-AKI risk 0.005 to 0.100) are classified as at low risk of developing severe $D_3$ SA-AKI. Patients allocated to TN3, TN6, and TN7 ($D_3$ SA-AKI risk 0.414 to 0.830) are classified as at high risk of developing severe $D_3$ SA-AKI.

FIG. 3: The figure depicts a classification tree for estimating mortality risk, also disclosed in U.S. Pat. No. 10,261,068 issued Apr. 16, 2019 and Wong et al., *Science Translational Medicine* 2019 11:518. The classification tree includes C-C chemokine ligand 3 (CCL3), interleukin 8 (IL8), heat shock protein 70 kDa 1B (HSPA1B), granzyme B (GZMB), matrix metallopeptidase 8 (MMP8), and admission platelet counts. The biomarker concentrations are shown in ng/ml and platelet counts are shown in number per microliter. The root node provides the total number of patients in the derivation cohort, and the number of survivors and non-survivors, with the respective rates. Each daughter node provides the respective decision rule criterion and the number of survivors and non-survivors, with the respective rates. Terminal nodes (TN) TN1, TN2, TN5, TN8, and TN9 are low risk terminal nodes (≤1.9% risk of death). TN4, TN6, TN7, and TN10 are intermediate risk terminal nodes (16.7% to 33.3% risk of death. TN3 and TN11 are high risk terminal nodes (≥44.4% risk of death).

DETAILED DESCRIPTION OF THE INVENTION

The present disclosure provides methods for determining whether a sepsis patient is likely to develop severe sepsis associated acute kidney injury (SA-AKI). The methods described here are useful in clinical decision support, including point-of-care ("POC") clinical decision making for individual patients. For example, the methods described here are useful in determining whether a sepsis patient is likely to benefit from renal protective therapy or more aggressive early therapy, such as renal replacement therapy (RRT) due to high risk of developing severe SA-AKI. The methods described here may also be used to prevent severe SA-AKI in patients at high risk by ensuring that such patients receive renal protective therapy at an early stage when it is likely to be most effective. Similarly, the methods are useful for identifying patients who will likely recover without progression to severe SA-AKI and therefore are useful to reduce exposure to aggressive interventions such as RRT in low risk patients. The identification of high and low risk patient cohorts using the methods described here can also be incorporated into methods for clinical trial design. One cause of clinical trial failure is the enrollment of low risk patients that do not need the experimental therapy for clinical improvement and prevention of AKI. Methods are needed for enrichment of clinical trial cohorts for patients in need of therapy. The present methods address this need by providing for the identification and selection of a high risk subset of patients for clinical trial enrollment.

The methods described here incorporate patient specific clinical data and patient specific biomarker data. In accordance with the methods described here, the patient specific clinical data and patient specific biomarker data are collected within the first 24 hours of sepsis diagnosis. Sepsis is diagnosed in accordance with recognized criteria in the medical arts, for example, a published consensus criteria. In embodiments, the subject is a pediatric patient having symptoms meeting pediatric specific consensus criteria for septic shock as described in Goldstein et al., *Pediatr Crit Care Med.* 2005 6(1):2-8.

In accordance with the methods described here, the patient specific clinical data includes a mortality risk and the patient's Kidney Disease Improving Global Outcomes (KDIGO) stage for acute kidney injury (AKI) as determined within the first 24 hours following diagnosis with sepsis (also referred to as "day 1 KDIGO"). KDIGO AKI stage is also determined in accordance with art-recognized criteria, such as those set forth in Kellum et al., *Kidney International Supplements* 2012 2:1-138 (*J. Int'l Society of Nephrology* 2(1) March 2012, Suppl. 1). In accordance with these criteria, AKI is defined by serum creatinine (SCr) levels as any of the following:

increase in SCr by greater than or equal to 0.3 mg/dl (26.5 umol/L) within 48 hours;
increase in SCr to greater than or equal to 1.5 times baseline, which is known or presumed to have occurred within the prior 7 days;
or urine volume less than 0.5 ml/kg/h for 6 hours.

Based on the KDIGO criteria, AKI is staged into three stages of increasing severity based upon serum creatinine levels and urine output. Accordingly, in some embodiments, the methods described here may further comprise determining or receiving additional clinical data of the subject, such as the subject's serum creatinine levels and urine output.

In accordance with the methods described here, the mortality risk is determined based upon six biomarkers using a decision tree methodology and predetermined cutoff values as depicted in FIG. 3 (see also U.S. Pat. No. 10,261,068 issued Apr. 16, 2019 and Wong et al., *Science Translational Medicine* 2019 11:518). A "decision tree" refers to a standard machine learning technique for multivariate data analysis and classification. Decision trees can be used to derive easily interpretable and intuitive rules for clinical decision support systems, as described herein. The six biomarkers used to determine mortality risk are C-C chemokine ligand 3 (CCL3), heat shock protein 70 kDa 1B (HSPA1B), interleukin-8 (IL8), granzyme B (GZMB), matrix metalloproteinase 8 (MMP8), and platelet count. The decision tree depicted in FIG. 3 assigns patients to terminal nodes, each of which provides a pre-specified, baseline mortality probability ranging from 0.000 to 0.571. In accordance with a specific implementation of the methods for predicting risk of SA-AKI described here, a cutoff value for mortality risk may be selected. In an exemplary embodiment, the cutoff for mortality is 0.019.

The model illustrated by the classification tree depicted in FIG. 3 was developed previously by the inventors and is referred to as PERSEVERE-II. PERSEVERE is a validated stratification tool for estimating the baseline risk of mortality among children with septic shock (Wong et al., *Crit Care* 2012 16: R174). PERSEVERE-II is an updated version of the model, incorporating admission platelet count as an additional predictor variable. Both models utilize classification and regression tree methodology and incorporate a panel of biomarkers which were selected objectively, using discovery oriented transcriptomic studies. See Wong et al., *Crit Care* 2012, 16: R174; Alder et al., *Expert Rev Anti Infect Ther* 2014, 12(7):809-816; and U.S. Pat. Nos. 9,238,841 and 10,261,068. The models have proven to be effective in derivation and test cohorts and can be used to augment population-based risk scores, such as the Acute Physiology and Chronic Health Evaluation (APACHE) and Pediatric RIsk of Mortality (PRISM) models. The APACHE and PRISM models generate mortality prediction scores based on physiological variables. While the APACHE and PRISM models can be very effective for estimating population-based outcome risks, they are not intended for stratification of individual patients. In contrast, the PERSEVERE models provide effective risk assessment for individual patients by identifying patients at high or low risk of mortality. This is important both for deciding which patients to include in clinical trials and for the more rational application of high risk therapies to individual sepsis patients. For example, high risk but potentially effective therapies, such as extracorporeal membrane oxygenation/life support, plasmapheresis, pulmonary artery catheterization, and high volume continuous hemofiltration, are widely applied as "last ditch" efforts in treating pediatric septic shock. The PERSEVERE models provide a more objective and timely selection of pediatric patients for these high risk therapies, thus increasing the probability of successful outcomes.

The original PERSEVERE infrastructure, on which PERSEVERE-II is also based, has been described previously. In brief, an annotated clinical database called Protocol Manager was linked to a Biological Specimen Tracking System (BSTS), which is web-based and was developed locally. Protocol Manager is web-enabled such that the collaborating centers can capture and directly enter data at the local level. All Division of Pediatric Informatics (Cincinnati Children's Hospital Medical Center) data collection systems incorporated a multi-layered data security approach through the use of roles, user accounts, and passwords. Secure data were protected by a firewall system. All annotated clinical data were de-identified and patients were assigned a unique research number for database queries; these research numbers were linked to samples via bar codes using the BSTS. The database was not de-identified with respect to disease process, outcomes, and clinical data. In fact, the database contains extensive clinical data (co-morbid conditions, medications, laboratory values, microbiology studies, outcomes, etc.), which allow biological data to be analyzed in the context of important clinical phenotypes. The database and the program's standard operating procedures were designed to ensure capture and entry of valid clinical data, with multiple strategies and cross-checks to ensure the validity of the clinical data.

The identification of biomarkers, model derivation, and validation of the original PERSEVERE was also been described previously, see Wong et al. *Crit Care* 2012, 16(5):

R174; Alder et al., *Expert Rev Anti Infect Ther* 2014 12(7): 809-816; and U.S. Pat. No. 9,238,841. Briefly, candidate biomarkers were selected objectively, using discovery oriented transcriptomic studies. The original model was derived using 12 candidate genes. A decision tree was developed through a binary recursive partitioning algorithm, and 2×2 contingency tables were assembled, showing true positives, true negatives, false positives, and false negatives. The model describes the relationship between the 12 identified biomarkers, clinical data including the PRISM score, and outcomes. Refinements yielded a 5-biomarker, 5-decision rule, 10-daughter node classification tree. Three biomarkers, CCL3, HSPA1B, and IL8, were found to be the primary predictors. The model was prospectively evaluated in a separate, independent test cohort of children with septic shock. Prospective validation of a derived risk model is a standard and required approach to rigorous clinical investigations. The feasibility of prospectively validating biomarker-based risk models in the context of pediatric septic shock has been demonstrated (Wong, H. et al. *Am. J. Respir. Crit. Care Med.* 2008 178:276-82).

As discussed in more detail below, although the PERSEVERE-II mortality probability was independently associated with severe day 3 SA-AKI ("$D_3$ SA-AKI") after accounting for the potential confounders of age and illness severity, PERSEVERE-II alone did not perform with sufficiently robust sensitivity and specificity to inform clinical decision making in this context. In order to be useful in clinical decision making, a model must generate positive and negative likelihood ratios that meet thresholds for clinical utility, for example as described in Gallagher, "Clinical utility of likelihood ratios" *Ann Emerg Med* (1998) 31:391-397 and Grimes D A, Schulz K F, "Refining clinical diagnosis with likelihood ratios" *Lancet* (2005) 365:1500-1505. A positive likelihood ratio greater than five (+LR>5) and a negative likelihood ratio less than two (−LR<0.2) are generally considered to have clinical utility. The methods described here meet these thresholds.

Likelihood ratios and their calculation are understood by the skilled person. Briefly, likelihood ratios represent the percentage of people with a condition and a given test result, divided by the percentage of people without the condition and the same test result. Positive and negative likelihood ratios (+LR, −LR) can be represented as +LR=Sensitivity/(1−specificity)

−LR=(1−Sensitivity)/Specificity.

In accordance with the methods described here, the patient specific biomarker data includes an amount of three blood-based biomarkers, heat shock protein 70 kDa 1B (HSPA1B), granzyme B (GZMB), and interleukin 8 (IL8). Since the mortality risk is determined based upon a combination of CCL3, HSPA1B, IL8, GZMB, MMP8, and platelet count, the methods described here may further comprise determining or receiving additional biomarker data of the patient such as the patient's serum levels of CCL3 and MMP8, and the patient's platelet count.

The combination of clinical and biomarker data comprising mortality risk, KDIGO AKI stage, and serum levels of HSPA1B, GZMB, and IL8, incorporated into the methods described here, is sufficient to discriminate between patients likely to develop severe sepsis associated AKI (SA-AKI) and those at low risk for severe SA-AKI. The methods described here therefore provide a clinically useful prediction of a patient's risk of developing severe SA-AKI. In accordance with the methods described here, a subject diagnosed with sepsis is determined to be at high or low risk of severe SA-AKI using a decision tree methodology. The decision tree incorporates patient specific clinical data, including the patient's mortality risk and day 1 KDIGO stage, and patient specific biomarker data, including serum or blood levels of HSPA1B, GZMB, and IL8. Predetermined cutoff values for the clinical and biomarker data are used in the decision tree. The methods described here comprise assigning a subject diagnosed with sepsis, preferably a human subject (also referred to interchangeably as a "patient") as either at high or low risk for SA-AKI based upon these clinical data and biomarker data obtained from the subject within the first 24 hours of diagnosis.

Figure 2:
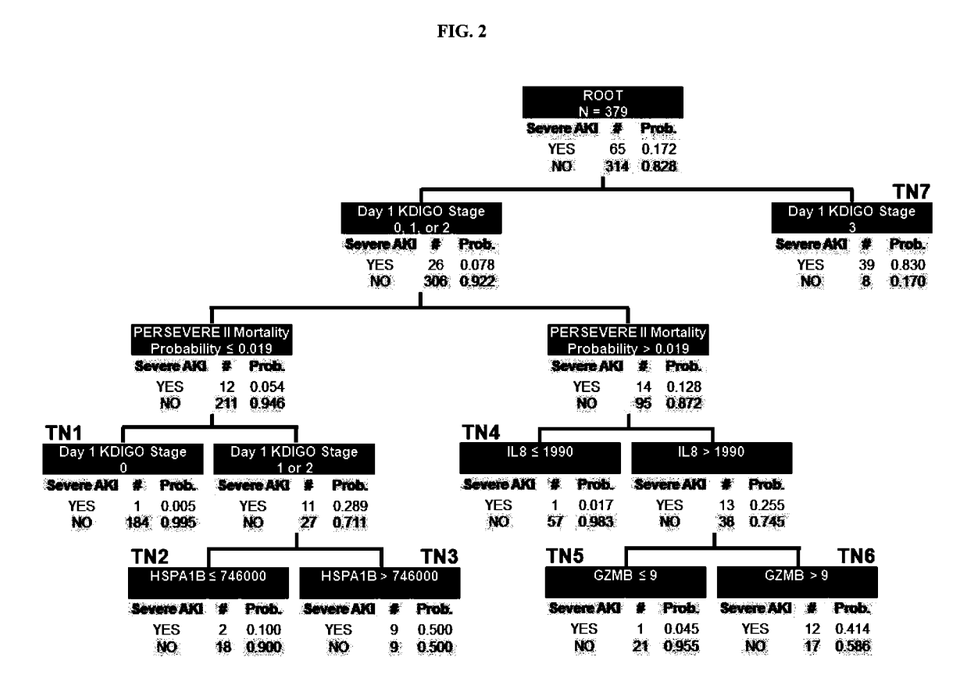

An exemplary implementation of the method is depicted by the classification tree shown in FIG. 2. In an initial step of the classification, the subject is assigned into one of two groups (corresponding to nodes in the decision tree) based on the subject's day 1 KDIGO stage for AKI. Subjects having a day 1 KDIGO stage of 3 are determined to be at high risk for severe SA-AKI (terminal node 7 ("TN 7") of FIG. 2). A subject having a day 1 KDIGO stage of 0, 1, or 2 is further classified based upon the subject's mortality risk. If the subject's mortality risk is less than or equal to a predetermined cutoff value, such as the value of 0.019 used in FIG. 2, and the subject has a day 1 KDIGO stage of 0, then the subject is determined to be at low risk for severe SA-AKI (TN 1 of FIG. 2).

For subjects having a day 1 KDIGO stage of 1 or 2 and a mortality risk less than or equal to a predetermined cutoff value, the method further comprises determining or receiving the level of HSPA1B in a biological sample from the subject, wherein an HSPA1B level less than or equal to a predetermined cutoff value, such as the value of 746000 used in FIG. 2 indicates low risk of severe $D_3$ SA-AKI (TN 2 of FIG. 2) and above the cutoff indicates a high risk TN 3 of FIG. 2).

For subjects having a day 1 KDIGO stage of 0, 1 or 2 and a mortality risk greater than 0.019, the method further comprises determining or receiving the level of IL8 in a biological sample from the subject, wherein an IL8 level less than or equal to a predetermined cutoff value, such as the value of 1990 used in FIG. 2, indicates a low risk of severe $D_3$ SA-AKI (TN 4 of FIG. 2). For subjects having an IL8 level above the cutoff value, the method further comprises determining or receiving the level of GZMB in a biological sample from the subject, wherein a GZMB level less than or equal to a predetermined cutoff value, such as the value of 9 used in FIG. 2 also indicates a low risk (TN 5 of FIG. 2) while a GZMB level greater than the predetermined cutoff value indicates a high risk (TN 6 of FIG. 2).

Unless otherwise noted, terms are to be understood according to conventional usage by those of ordinary skill in the relevant art.

In accordance with the methods described here, the SA-AKI may be characterized as "severe" SA-AKI. In this context, the term "severe" refers to a KDIGO stage 2 AKI or higher, which is at least a two-fold increase in SCr from baseline.

As used herein, the term "subject" refers to a mammal, for example a mouse, a rat, a dog, a guinea pig, a non-human primate, or a human. In some embodiments, the subject is a human. The term "patient" refers to a human subject. In some embodiments, the subject is a pediatric patient. A pediatric patient is defined as one under 18 years of age.

As used herein, the terms "treatment," "treating," "treat," and the like, refer to obtaining a desired pharmacologic and/or physiologic effect in relation to a disease or disorder.

The effect is therapeutic in terms of achieving a clinical response, which may be partial or complete, and may alleviate one or more symptoms attributable to the disease or disorder being treated. The terms "prevention", "preventing", and "prevent" refer to prophylaxis of a disease or disorder and are prophylactic in terms of completely or partially preventing the disease or disorder from occurring in a subject, or completely or partially preventing the occurrence of one or more clinical symptoms of the disease or disorder.

As used herein, the term "marker" or "biomarker" refers to a biological molecule, such as, for example, a nucleic acid, a peptide, a protein, or a small biomolecule such as a creatinine, whose presence or absence, or concentration in a biological sample, can be detected and correlated with a clinical diagnosis, a clinical prognosis, or a clinical risk, such as risk of mortality or risk of developing SA-AKI. In embodiments, the biomarker is a protein or peptide detectable in the serum or blood of a mammalian subject. In some embodiments, the methods described here further comprise detecting serum creatinine levels in a biological sample obtained from a subject.

Biological Sample Acquisition and Analysis

The methods described here may include obtaining or acquiring a biological sample from a subject, such as a sepsis patient, or more particularly a pediatric sepsis patient. Preferably the sample is acquired during the first 24 hours of a septic shock diagnosis. In some embodiments, a sample is acquired within the first 1-3 hours of diagnosis with septic shock. In some embodiments, a sample is acquired within the first 8-12 hours of diagnosis with septic shock. In some embodiments, a sample is acquired within the first 24 hours of diagnosis with septic shock.

The methods described here may include detecting and/or determining the amount or level (these terms are used interchangeably) of a biomarker in a biological sample obtained from a subject, such as a serum, plasma, or whole blood sample. In embodiments, the biomarker is selected from IL8, HSPA1B, and GZMB. In some embodiments, the methods may further comprise detecting and/or determining the serum levels of one or more additional biomarkers selected from CCL3, MMP8, and platelet count. In embodiments, each of CCL3, IL8, HSPA1B, GZMB, MMP8, and platelet count is determined or received in the practice of the methods described here. In embodiments, each of IL8, HSPA1B, and GZMB is determined or received in the practice of the methods described here.

Serum concentrations of protein and peptide-based biomarkers can be determined by methods known to the skilled person. For example, using a multi-plex magnetic bead platform to isolate the analyte from the biological sample, such as those commercially available from the Millipore Corp (Billerica, MA) and known, for example, by the tradename MILLIPLEX™ MAP. Analyte concentration may be measured, for example, using a system such as that known by the tradename Luminex® (Luminex Corporation, Austin, TX), according the manufacturers' specifications. These examples are not intended to be limiting, only illustrative. Any method or system for isolating, detecting or quantifying the amount of a protein or peptide-based biomarker in a biological sample can be used.

Additional Patient Information

The demographic data, additional clinical characteristics, and/or results from other tests or indicia of septic shock specific to a patient with septic shock can affect the patient's outcome risk. Accordingly, such demographic data, clinical characteristics, and/or results from other tests or indicia of septic shock can be incorporated into the methods described herein. In embodiments, patient demographic data includes one or more of the patient's age, race, and gender. In embodiments, patient clinical characteristics include one or more of the patient's co-morbidities and/or septic shock causative organism.

In some embodiments, the methods incorporate patient demographic data selected from one or more of the patient's age, race, or gender. In embodiments, the methods incorporate patient clinical characteristics selected from a test result and co-morbidities. Co-morbidities can include, for example, acute lymphocytic leukemia, acute myeloid leukemia, aplastic anemia, atrial and ventricular septal defects, bone marrow transplantation, caustic ingestion, chronic granulomatous disease, chronic hepatic failure, chronic lung disease, chronic lymphopenia, chronic obstructive pulmonary disease (COPD), congestive heart failure (NYHA Class IV CHF), Cri du Chat syndrome, cyclic neutropenia, developmental delay, diabetes, DiGeorge syndrome, Down syndrome, drowning, end stage renal disease, glycogen storage disease type 1, hematologic or metastatic solid organ malignancy, hemophagocytic lymphohistiocytosis, hepatoblastoma, heterotaxy, hydrocephalus, hypoplastic left heart syndrome, IPEX Syndrome, kidney transplant, Langerhans cell histiocytosis, liver and bowel transplant, liver failure, liver transplant, medulloblastoma, metaleukodystrophy, mitochondrial disorder, multiple congenital anomalies, multivisceral transplant, nephrotic syndrome, neuroblastoma, neuromuscular disorder, obstructed pulmonary veins, Pallister Killian syndrome, Prader-Willi syndrome, requirement for chronic dialysis, requirement for chronic steroids, retinoblastoma, rhabdomyosarcoma, rhabdosarcoma, sarcoma, seizure disorder, severe combined immune deficiency, short gut syndrome, sickle cell disease, sleep apnea, small bowel transplant, subglottic stenosis, tracheal stenosis, traumatic brain injury, trisomy 18, type 1 diabetes mellitus, unspecified brain tumor, unspecified congenital heart disease, unspecified leukemia, VATER Syndrome, Wilms tumor, and the like. Any one or more of the above patient co-morbidities can be indicative of the presence or absence of chronic disease in the patient.

Septic shock causative organisms can include, for example, *Acinetobacter baumannii*, Adenovirus, *Bacteroides* species, *Candida* species, *Capnotyophaga jemmi*, Cytomegalovirus, *Enterobacter cloacae, Enterococcus faecalis, Escherichia coli, Herpes simplex* virus, Human metapneumovirus, Influenza A, *Klebsiella pneumonia, Micrococcus* species, mixed bacterial infection, *Moraxella catarrhalis, Neisseria meningitides*, Parainfluenza, *Pseudomonas* species, *Serratia marcescens, Staphylococcus aureus, Streptococcus agalactiae, Streptococcus milleri, Streptococcus pneumonia, Streptococcus pyogenes*, unspecified gram negative rods, unspecified gram positive cocci, and the like.

Treatment of the High Risk Subject

In embodiments, the methods described here include treating the subject identified as at high risk of SA-AKI. In embodiments, the subject is treated with renal protective therapy. In embodiments, renal protective therapy may include one or more of close attention to urine output, including the placement of a foley catheter; aggressive maintenance of adequate blood pressure and renal perfusion pressure; avoidance of nephrotoxins; and early nephrology consult. In some embodiments, the renal protective therapy is a standardized acute kidney injury care bundle, for example as described in Bagshaw, Nephron 2015 131:247-251; Meersch et al., *Intensive Care Medicine* 2017 43:1551-

1561k; and Gocze et al., *Annals of Surgery* 2018 267:1013-1020. In embodiments, the subject is treated with renal replacement therapy (RRT).

In some embodiments, the methods described here include treating the subject identified as at low risk of SA-AKI by excluding the low risk subject from one or more aggressive and/or high risk therapies, such as renal replacement therapy (RRT) or more aggressive blood pressure management which could require placement of an arterial line for blood pressure monitoring, and a central line for the infusion of vasoactive medications.

Model Performance

Diagnostic-testing procedure performance is commonly described by evaluating control groups to obtain four critical test characteristics, namely positive predictive value (PPV), negative predictive value (NPV), sensitivity, and specificity, which provide information regarding the effectiveness of the test. The PPV of a particular diagnostic test represents the proportion of subjects with a positive test result who are correctly diagnosed; for tests with a high PPV, a positive test indicates the presence of the condition in question. The NPV of a particular diagnostic test represents the proportion of subjects with a negative test result who are correctly diagnosed; for tests with a high NPV, a negative test indicates the absence of the condition. Sensitivity represents the proportion of correctly identified subjects who are actual positives; for tests with high sensitivity, a positive test indicates the presence of the condition in question. Specificity represents the proportion of correctly identified subjects who are actual negatives; for tests with high specificity, a negative test indicates the absence of the condition.

The threshold for the disease state can alternatively be defined as a 1-dimensional quantitative score, or diagnostic cutoff, based upon receiver operating characteristic (ROC) analysis. The quantitative score based upon ROC analysis can be used to determine the specificity and/or the sensitivity of a given diagnosis based upon subjecting a subject to the decision tree described herein in order to predict an outcome for the subject.

The methods and materials of the invention are expressly contemplated to be used both alone and in combination with other tests and indicia, whether quantitative or qualitative in nature.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Methods

Study Design and Patient Selection

We conducted a secondary analysis of a prospective, observational cohort study of children admitted with septic shock to 14 pediatric intensive care units (PICUs) in the United States from January 2015 to December 2018 (Wong et al., *Science Translational Medicine* 2019 11(518)). The study protocol was approved by the Institutional Review Boards at each participating institution, and was previously described in detail (Wong et al., *Crit Care* 2012 16: R174; Wong et al., *Physiol Genomics* 2007 30:146-155). Briefly, patients between the ages of 1 week and 18 years were enrolled after obtaining informed consent from parents or legal guardians. The inclusion criteria were based on pediatric-specific consensus criteria (Goldstein et al., *Pediatr Crit Care Med* 2005 6:2-8); there were no exclusion criteria other than the inability to obtain informed consent. Clinical and laboratory data were collected daily while in the PICU. Mortality was tracked for 28 days after enrollment. PICU-free days were calculated by subtracting the number of days in the PICU from a maximum of 28 days. Patients with a PICU length of stay greater than 28 days or those who died by 28 days were assigned a value of zero PICU-free days.

Patients from the original study (n=461) were included in the analyses if they had serum creatinine (SCr) data available from both admission (day 1) and day 3 of septic shock (n=328). We also included patients who had been discharged from the PICU alive prior to day 3 and without evidence of AKI (n=51); these subjects were presumed not to have AKI on day 3. We excluded patients without any SCr data, those still admitted to the PICU on day 3 of septic shock but with missing day 3 SCr values, those discharged from the PICU alive prior to day 3 with evidence of AKI, and those with pre-existing kidney disease (n=82).

Primary Outcome

The primary outcome of interest was the development of severe $D_3$ SA-AKI. Severe SA-AKI was defined as Kidney Disease Improving Global Outcomes (KDIGO) stage 2 AKI or higher, which is at least a two-fold increase in SCr from baseline (Kellum et al., *Kidney International Supplements* 2012 2:1-138). Day 3 was selected based on the definition of persistent AKI provided by the Sixteenth Consensus Conference of the Acute Dialysis Quality Initiative (ADQI 16), which is kidney injury sustained beyond 48 hours, well documented to be associated with poor outcomes (Chawla et al., *Nature Reviews Nephrology* 2017 13:241). This endpoint has been demonstrated to be associated with poor outcomes in critically ill patients (Chawla et al., on behalf of the Acute Disease Quality Initiative Workgroup 16. Acute kidney disease and renal recovery: consensus report of the Acute Disease Quality Initiative (ADQI) 16 Workgroup. *Nature Reviews Nephrology* 2017 13:241)

Baseline SCr was estimated for each patient using their calculated body surface area ($m^2$) and an eGFR of 120 ml/min per 1.73 $m^2$, as validated in the literature (Kaddourah et al., *N Engl J Med* 2017 376:11-20; Zappitelli et al., *Clin J Am Soc Nephrol* 2008 3:948-954). When patient height data was unavailable (n=20), the age-based Pottel method was used, recently validated to be a reliable height-independent method for estimating baseline SCr in children.

Secondary Outcomes

Secondary outcomes included the incidence of renal replacement therapy (RRT) use and the incidence of renal recovery by day 3 of septic shock. Renal recovery was defined as any improvement of AKI stage by day 3 among patients with early AKI, which was defined as KDIGO stage≥1 on day 1 or 2 of septic shock.

PERSEVERE Biomarkers and Baseline Mortality Risk Assignment

The PERSEVERE biomarkers—C-C chemokine ligand 3, granzyme B, heat shock protein 70 kDa 1B, interleukin-8 and matrix metallopeptidase 8—were measured from serum samples obtained within 24 hours of a septic shock diagnosis, as previously described (Wong et al., *Science Translational Medicine* 2019 11(518); Wong et al., *Crit Care* 2012; 16: R174). Using the biomarker data and admission platelet counts, each patient was classified according to the previously published and validated PERSEVERE-II decision tree, which was derived using classification and regression tree methodology (Wong et al., *Crit Care Med* 2016 44:2010-2017). Using pre-specified biomarker concentration and platelet count decision rules, the PERSEVERE-II decision tree assigns patients to terminal nodes, each of which provides a pre-specified, baseline mortality probability ranging from 0.000 to 0.571. The PERSEVERE-II derived mortality probabilities were used for the logistic regression and modeling procedures described below. In other analyses, patients were grouped into one of three previously defined PERSEVERE-II based categorical mortality risk strata: low risk (mortality probability 0.000 to 0.019), intermediate risk (mortality probability 0.167 to 0.189), and high risk (mortality probability 0.300 to 0.571) (Wong et al., *Science Translational Medicine* 2019 11(518).

Statistical Analysis and Modeling

Data were first described using medians, interquartile ranges, frequencies and percentages. Comparisons between groups were performed using Wilcoxon rank-sum, Chi-square test, or Fisher exact test, as appropriate. Multivariable logistic regression analyses were performed to assess the ability of PERSEVERE-II mortality probability to predict the development of severe $D_3$ SA-AKI, need for RRT use, and day 3 renal recovery, after correction for severity of illness (PRISM III score) and patient age, which are potential confounders of interest. A p-value of <0.05 was considered statistically significant. All statistical analyses were performed using Sigmaplot 14.0 (Systat Software Inc, San Jose, CA, USA).

We used Classification and Regression Tree (CART) methodology to derive a new model estimating the probability of severe $D_3$ SA-AKI (Salford Predictive Modeler v8.0, Salford Systems). Predictor variables included day 1 KDIGO AKI stage, PERSEVERE-II mortality probability, and the PERSEVERE biomarkers. We pruned terminal nodes having <5% of the patients in the root node and terminal nodes that did not improve classification, based on the Class Probability method. Weighting of cases and costs for misclassification was not used. Performance of the derived model is reported using diagnostic test statistics, and tested using a 10-fold cross validation procedure. Model performance was further tested using a historical cohort of children with septic shock previously reported in a study evaluating the association between hyperchloremia and severe $D_3$ SA-AKI (Stenson et al., *Intensive Care Med* 2018; 44:2004-2005). The historical cohort was enrolled between 2002 and 2015. Among the 691 subjects reported in that previous study, there were 461 with PERSEVERE-II data, and among these there were 102 (21%) with $D_3$ SA-AKI. The net reclassification improvement (NRI) was used to estimate the incremental predictive ability of the newly derived model, relative to knowing the day 1 AKI status alone (Steyerberg et al., *Epidemiology* 2010 21:128-138). The NRI was computed using the R-package Hmisc (Vanderbilt Biostatistics Wiki [Internet]. Nashville, TN: Hmisc Package; [revised 2018 September; accessed 2019 Oct. 4]).

Results

Baseline Characteristics

The study cohort consisted of 379 patients of whom 65 (17%) had severe $D_3$ SA-AKI. Table 1 provides the clinical and demographic characteristics of the cohort according to the presence of severe $D_3$ SA-AKI. Compared to those without severe $D_3$ SA-AKI, patients with severe $D_3$ SA-AKI had higher PRISM IIII scores, higher PERSEVERE-II mortality probabilities, higher 28-day mortality, greater PICU LOS, and fewer PICU-free days. No other differences were noted.

TABLE 1

Clinical and demographic variables according to the presence of severe AKI on day 3 of septic shock.

| Variable | No Severe Day 3 AKI | Severe Day 3 AKI | P value |
|---|---|---|---|
| N (%) | 314 (83) | 65 (17) | — |
| Age, years* | 6.5 (2.5-12.4) | 5.1 (1.3-13.5) | 0.32 |
| Gender, n (% male) | 162 (52) | 33 (51) | 0.99 |
| PRISM III | 10 (6-14) | 14 (10-20.5) | <0.001 |
| PERSEVERE II Mortality Risk | 0.007 (0.007-0.167) | 0.189 (0.019-0.33) | <0.001 |
| Organism, n (%) | | | |
| Gram positive | 68 (22) | 13 (20) | 0.90 |
| Gram negative | 77 (25) | 19 (29) | 0.52 |
| Viral | 23 (7) | 6 (9) | 0.79 |
| Fungal | 6 (2) | 4 (6) | 0.13 |
| None | 140 (45) | 23 (35) | 0.22 |
| Mortality, n (%) | 18 (6) | 24 (37) | <0.001 |
| PICU LOS, days | 6 (3-12) | 10 (7-21) | <0.001 |
| PICU-Free Days | 22 (14-25) | 5 (0-19) | <0.001 |

*Continuous variables are reported as median (IQR)

Primary Analysis

Figure 1A:
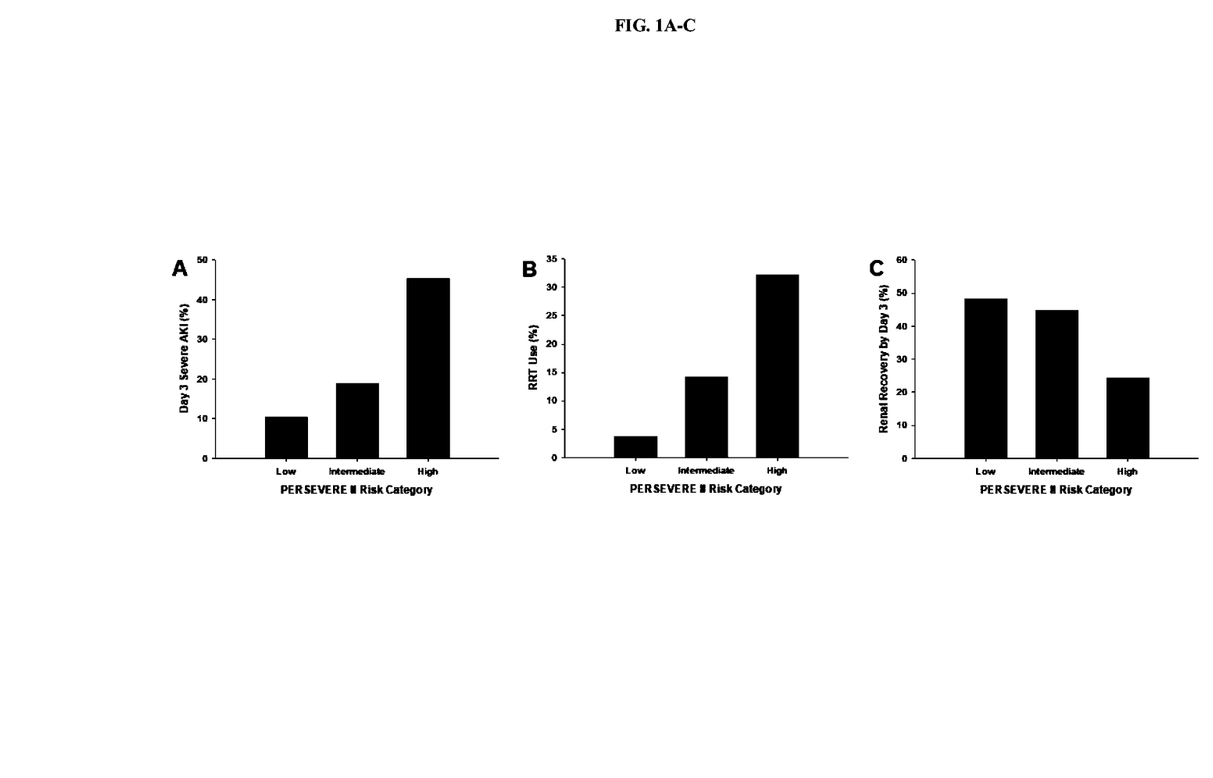

The primary analysis focused on the association between PERSEVERE-II mortality probability and severe $D_3$ SA-AKI. The proportion of patients who developed severe $D_3$ SA-AKI increased directly with PERSEVERE-II risk assignment category (FIG. 1A. To further assess the association between PERSEVERE-II mortality probability and the development of severe $D_3$ SA-AKI, we conducted multivariable logistic regression (Table 2). After adjusting for PRISM III and age, the PERSEVERE-II mortality probability was independently associated with increased odds of severe $D_3$ SA-AKI.

TABLE 2

Multivariable regression testing for an association between PERSEVERE II mortality probability and septic shock-associated AKI outcomes.

| Outcome | Variable | | O.R | 95% C.I. | P value |
|---|---|---|---|---|---|
| Severe Day 3 AKI | PERSEVERE II* | 379 | 1.4 | 1.2-1.7 | <0.001 |
| | PRISM III | | 1.1 | 1.0-1.1 | <0.001 |
| | Age (years) | | 1.0 | 0.9-1.0 | 0.972 |
| RRT Use | PERSEVERE II* | 379 | 1.6 | 1.3-2.0 | <0.001 |
| | PRISM III | | 1.1 | 1.0-1.1 | 0.003 |
| | Age (years) | | 1.0 | 1.0-1.1 | 0.581 |
| Day 3 Renal Recovery | PERSEVERE II* | 131 | 1.3† | 1.0-1.6 | 0.047 |
| | PRISM III | | 1.0 | 0.9-1.1 | 0.745 |
| | Age (years) | | 1.0 | 0.9-1.1 | 0.962 |

*The raw PERSEVERE-II mortality probability was transformed by a factor of 10 for the logistic regression analyses.
†Lower PERSEVERE-II mortality probability associated with increased odds of renal recovery Secondary Analyses We assessed the requirement for RRT and incidence of renal recovery as secondary outcomes. Among the 379 patients in the cohort, 38 (10%) required RRT. Similar to severe $D_3$ SA-AKI, the incidence of RRT use increased directly with increasing PERSEVERE-II mortality risk category (FIG. 1B). After adjusting for age and PRISM III, the PERSEVERE-II mortality probability was independently associated with increased odds of needing RRT (Table 2).

One hundred thirty-one patients (35%) had early AKI. Among these patients, the proportion who had renal recovery by day 3 decreased directly with PERSEVERE-II risk assignment category (FIG. 1C). After adjusting for PRISM III and age, a lower PERSEVERE-II mortality probability was independently associated with increased odds of renal recovery by day 3 of septic shock (Table 2).

Estimating the Risk of Severe $D_3$ SA-AKI

The data above suggest that PERSEVERE-H, or the PERSEVERE biomarkers, could have clinical utility for identifying children at risk for severe $D_3$ SA-AKI, as well as those who have evidence of AKI in the first 48 hours, but will recover by day 3 of septic shock. The PERSEVERE-H mortality probability had an AUROC of 0.73 (95% C.I. 0.66 to 0.79; p<0.001) for discriminating between patients with and without severe $D_3$ SA-AKI. This AUROC reflects a sensitivity of 62% (95% C.I. 49 to 73) and a specificity of 69% (95% C.I. 63 to 74).

While the AUROC of PERSEVERE-II for predicting severe $D_3$ SA-AKI is statistically significant, the corresponding sensitivity and specificity are not sufficiently robust to inform clinical decision making. Accordingly, we derived a new model, using the PERSEVERE biomarkers and AKI status at admission, to more reliably estimate the risk of severe $D_3$ SA-AKI. The severity of AKI on day 1 of septic shock by itself had reasonable performance for discriminating between patients with and without severe $D_3$ SA-AKI (AUROC 0.87; 95% C.I. 0.82 to 0.93). Accordingly, we conducted our modeling procedures with the pre-specified goal of significantly improving upon this performance.

FIG. 2 shows the CART-derived model. Day 1 AKI status informed the first level decision rule. Patients with KDIGO stage 3 AKI on day 1 had a 0.83 probability of having severe $D_3$ SA-AKI (terminal node 7, right side of the decision tree). The remaining patients, those with KDIGO stage 0, 1, or 2 on day 1, occupy the left side of the decision tree. Among these patients, the PERSEVERE-II mortality probability, heat shock protein 70 kDa 1B (HSPA1B), granzyme B (GZMB), and interleukin 8 (IL8) added to the predictive capacity for severe $D_3$ SA-AKI. The AUROC of the decision tree for discriminating between patients with and without severe $D_3$ SA-AKI was 0.95 (95% C.I. 0.92 to 0.98). Table 3 shows the other diagnostic test characteristics of the decision tree for estimating the risk of severe $D_3$ SA-AKI, compared to day 1 KDIGO status alone. Among the five false negative subjects in the model, only one required RRT and all survived to 28 days.

TABLE 3

Diagnostic test characteristics of the decision tree.

| Variable | CART-Derived Model | | Day 1 KDIGO Status Model | |
| --- | --- | --- | --- | --- |
| | Value | 95% C.I. | Value | 95% C.I. |
| AUC | 0.95* | 0.92 to 0.98 | 0.87 | 0.82 to 0.93 |
| True Positives, n | 60 | — | 55 | — |
| True Negatives, n | 280 | — | 254 | — |
| False Positives, n | 34 | — | 60 | — |
| False Negatives, n | 5 | — | 10 | — |
| Sensitivity | 92% | 82 to 97 | 85% | 73 to 92 |
| Specificity | 89% | 85 to 92 | 81% | 76 to 85 |
| Positive Predictive Value | 64% | 53 to 73 | 48% | 38 to 57 |
| Negative Predictive Value | 98% | 95 to 99 | 96% | 93 to 98 |
| (+) Likelihood Ratio | 8.5 | 6.2 to 11.8 | 4.4 | 3.4 to 5.7 |
| (−) Likelihood Ratio | 0.09 | 0.04 to 0.20 | 0.2 | 0.1 to 0.3 |

*10-fold cross validation AUC = 0.88

The AUROC of the derived model was superior to that of day 1 AKI status alone (p=0.001). The NRI of the model, relative to day 1 AKI status alone, was 1.0 (95% CI: 0.8 to 1.2, p<0.001). This NRI reflected an NRI for events of 0.3 (95% CI: 0.1 to 0.4, p<0.001) and for non-events of 0.7 (95% CI: 0.6 to 0.8, p<0.001).

Upon 10-fold cross validation, the decision tree had a summary AUROC of 0.88. When tested in the historical test cohort (n=461), the decision tree had an AUROC of 0.83 (95% CI: 0.79 to 0.88, p<0.001).

Discussion

In this secondary analysis of a large, prospective study of critically ill children with septic shock, we found that the PERSEVERE-II baseline mortality probability was associated with development of severe $D_3$ SA-AKI. The proportion of patients developing severe $D_3$ SA-AKI increased directly with increasing PERSEVERE-II mortality risk category. In addition, the PERSEVERE-II mortality probability was independently associated with severe $D_3$ SA-AKI after accounting for the potential confounders of age and illness severity. We also evaluated two related SA-AKI endpoints, the need for RRT and renal recovery among those with early AKI. The PERSEVERE-II mortality probability was also independently associated with these two clinically relevant outcomes.

Although the association between PERSEVERE-II and severe $D_3$ SA-AKI was robust, it did not provide sufficient discrimination between those with and without severe $D_3$ SA-AKI to have clinical utility. Accordingly, we derived a new model to more reliably estimate the risk of severe $D_3$ SA-AKI, incorporating the severity of AKI on day 1 of septic shock, the PERSEVERE-II mortality probability, and a subset of the PERSEVERE biomarkers. The model generates positive and negative likelihood ratios that meet thresholds for clinical utility (Gallagher E J. Clinical utility of likelihood ratios. *Ann Emerg Med* 1998 31:391-397; Grimes D A, Schulz K F. Refining clinical diagnosis with likelihood ratios. *Lancet* 2005 365:1500-1505), and performed well upon a 10-fold cross validation procedure and when tested in a separate historical cohort.

Beyond estimating the risk of severe $D_3$ SA-AKI, the model also provides insight regarding the natural history of severe SA-AKI in the pediatric septic shock population. The model shows that the presence of stage 3 AKI on day 1 is the strongest predictor of severe $D_3$ SA-AKI; among the 47 subjects having stage 3 AKI on day 1, 39 (83%) developed severe $D_3$ SA-AKI, and 29 (74%) of those required RRT. To our knowledge has not been previously reported among children with septic shock. Among the remaining subjects, those with AKI stage 0 to 2 on day 1, the model was able to reliably estimate the risk of severe $D_3$ SA-AKI. An added benefit of this estimate is the ability to identify subjects with early AKI who will recover renal function: combined, terminal nodes 2, 4, and 5 identify 47 subjects (12% of the whole cohort) with stage 1 or 2 AKI on day 1 who have a low risk of severe $D_3$ SA-AKI. These 47 subjects demonstrated renal recovery by day 3 of septic shock, as defined in the current study. We note that among the four false negative subjects allocated to terminal nodes 2, 4, and 5, only one required RRT.

Collectively, these findings suggest that the development of severe $D_3$ SA-AKI, as well as renal recovery, can be predicted early in the course of septic shock, through the utilization of the PERSEVERE biomarkers and clinical data collected in the first 24 hours. The importance of early recognition and proactive intervention in patients at risk for severe SA-AKI is highlighted by its association with poor outcomes and lack of available disease modifying therapies once present (Fitzgerald et al., *Pediatr Nephrol* 2018 33:1781-1790; 42-44). Recognition of these consequences has resulted in several prior attempts to develop reliable enrichment strategies for SA-AKI prediction. These include the utilization of known kidney injury biomarkers (Wheeler et al., Serum Neutrophil Gelatinase-associated Lipocalin (NGAL) as a Marker of Acute Kidney Injury in Critically Ill Children with Septic Shock. *Crit Care Med* 2008 36:1297-1303; Kim et al., is plasma neutrophil gelatinase-associated lipocalin a predictive biomarker for acute kidney injury in sepsis patients? A systematic review and meta-analysis. *J Crit Care* 2016 33:213-223; Tu Y et al., Urinary netrin-1 and KIM-1 as early biomarkers for septic acute kidney injury. *Ren Fail* 2014; 36:1559-1563; Honore et al., Urinary Tissue Inhibitor of Metalloproteinase-2 and Insulin-Like Growth Factor-Binding Protein 7 for Risk Stratification of Acute Kidney Injury in Patients With Sepsis. *Crit Care Med* 2016 44:1851-1860), attempts at novel candidate biomarker discovery (Basu R K et al., Identification of candidate serum biomarkers for severe septic shock-associated kidney injury via microarray. *Crit Care* 2011 15: R273), and through the use of easily accessible clinical parameters (Song J et al., Value of the combination of renal resistance index and central venous pressure in the early prediction of sepsis-induced acute kidney injury. *J Crit Care* 2018; 45:204-208; Lee C-W et al., A combination of SOFA score and biomarkers gives a better prediction of septic AKI and in-hospital mortality in critically ill surgical patients: a pilot study. *World J Emerg Surg* 2018; 13:41; Zhou J et al., A simple risk score for prediction of sepsis associated-acute kidney injury in critically ill patients. *J Nephrol* 2019 6:947-956). However, there remains a need for effective strategies to predict patients likely to develop SA-AKI. Our prediction model meets the required thresholds for clinical utility, offering a potentially clinically feasible strategy for early identification of high risk patients who may benefit from proactive intervention.

Additionally, the identification of patients at highest risk for requiring RRT is potentially useful given the ongoing debate surrounding the optimal timing of RRT initiation in critically ill patients, including those with sepsis, with some data suggesting early RRT initiation improves outcomes (47-53). Finally, the identification of patients likely to have renal recovery by day 3 of septic shock—a subset of patients about whom little data exists—is also useful, as it identifies a low-risk cohort who may not require significant intervention and could inform SA-AKI clinical trial enrollment in the future. Our data provide a potential strategy to identify all three of these subsets of patients early and accurately, allowing for a more personalized approach to their care.

What is claimed is:

1. A method for identifying and treating a subject at high risk for sepsis associated acute kidney injury (SA-AKI) in a subject in need thereof, the method comprising determining or receiving a combination of clinical data and biomarker data from the subject, the clinical data comprising the subject's Kidney Disease Improving Global Outcomes (KDIGO) stage for acute kidney injury (AKI) and a mortality risk; the biomarker data comprising an amount of each of heat shock protein 70 kDa 1B (HSPA1B), interleukin-8 (IL8), and granzyme B (GZMB) in a biological sample of the subject, wherein the clinical data and the biomarker data are determined during the first 24 hours following the subject's diagnosis with sepsis; determining the subject's risk of developing SA-AKI based upon the combination of the clinical data and the biomarker data; and treating the high risk subject with one or more of renal protective therapy, renal replacement therapy (RRT) extracorporeal membrane oxygenation, plasmapheresis, pulmonary artery catheterization, or high volume continuous hemofiltration.

2. The method of claim 1, wherein determining the subject's risk of developing SA-AKI comprises assigning the subject into one of two groups based on the subject's KDIGO stage.

3. The method of claim 2, wherein the subject having a KDIGO stage of 3 is assigned to a high risk group and is determined to be at high risk for developing SA-AKI.

4. The method of claim 2, wherein the subject having a KDIGO stage of 0, 1, or 2 is further assigned into one of two groups based upon the subject's mortality risk assessment.

5. The method of claim 4, wherein the subject having a mortality risk assessment below a predetermined cutoff value and a KDIGO stage of 0 is determined to be at low risk for developing SA-AKI.

6. The method of claim 4, wherein the subject having a mortality risk assessment below a predetermined cutoff value and a KDIGO stage of 1 or 2 is further assigned into one of two groups based upon the subject's HSPA1B level.

7. The method of claim 6, wherein the subject having an HSPA1B level less than a predetermined cutoff value is determined to be at low risk for developing SA-AKI and the subject having an HSPA1B level higher than a predetermined cutoff value is determined to be at high risk.

8. The method of claim 4, wherein the subject having a mortality risk assessment above a predetermined cutoff value and a KDIGO stage of 0, 1 or 2 is further assigned into one of two groups based upon the subject's IL8 level.

9. The method of claim 8, wherein the subject having an IL8 level less than a predetermined cutoff value is determined to be at low risk for developing SA-AKI.

10. The method of claim 8, wherein the subject having an IL8 level higher than a predetermined cutoff value is further assigned into one of two groups based upon the subject's GZMB level.

11. The method of claim 10, wherein the subject having a GZMB level less than a predetermined cutoff value is determined to be at low risk for developing SA-AKI and the subject having a GZMB level higher than a predetermined cutoff value is determined to be at high risk.

12. The method of claim 1, wherein the mortality risk is determined by a method comprising determining or receiving additional biomarker data and clinical data of the subject, the additional biomarker data comprising serum protein or peptide levels of C-C chemokine ligand 3 (CCL3) and matrix metalloproteinase 8 (MMP8), and the additional clinical data comprising platelet count.

13. The method of claim 1, wherein the mortality risk is determined by a method comprising a decision tree.

14. The method of claim 1, wherein the subject is human.

15. The method of claim 1, wherein the subject is a pediatric patient.

16. The method of claim 1, wherein the SA-AKI is characterized as severe SA-AKI.

* * * * *